United States Patent [19]
Marron

[11] Patent Number: 4,502,457
[45] Date of Patent: Mar. 5, 1985

[54] UNIVERSAL MULTIPLE ANGLE WORK PIECE HOLDER WITH MULTIPLE TOOL CONVERSION FEATURES

[75] Inventor: Antonio G. Marron, Inglewood, Calif.

[73] Assignees: Raul C. Montoya, Los Angeles; Victor G. Marron, Inglewood, both of Calif.

[21] Appl. No.: 412,301

[22] Filed: Aug. 27, 1982

[51] Int. Cl.³ .................. B24B 53/00; B24B 41/06; B23Q 1/04; B25B 1/22
[52] U.S. Cl. ...................... 125/11 A; 51/216 A; 51/216 H; 51/217 A; 51/218 A; 269/71
[58] Field of Search ............ 51/216 R, 216 A, 216 P, 51/216 H, 217 R, 217 P, 217 A, 218 A; 125/11 A; 269/71, 76, 82, 88

[56] References Cited
U.S. PATENT DOCUMENTS

| | | | |
|---|---|---|---|
| 1,414,970 | 5/1922 | Nelson | 51/216 A |
| 2,390,428 | 12/1945 | Disse | 269/71 |
| 2,432,058 | 12/1947 | Wiken et al. | 51/217 A |
| 2,444,727 | 7/1948 | Bush | 51/217 A |
| 2,509,338 | 5/1950 | Elliott et al. | 269/71 X |
| 3,680,268 | 8/1972 | Lorton | 51/218 A |
| 4,140,307 | 2/1979 | Dalmau et al. | 269/71 |

Primary Examiner—James L. Jones, Jr.
Assistant Examiner—Debra S. Meislin
Attorney, Agent, or Firm—Thomas I. Rozsa

[57] ABSTRACT

The present invention relates to an improved universal multiple angle work piece holder which is capable of setting an object at any desired compound angle so that the object may be machined at any desired location. The invention further relates to an apparatus which can be securely adjusted in a manner that provides a firm support for the object to be machined and provides an angle adjustment design which allows the object to be machined to be adjacent the center lines of the universal multiple angle work piece holder. The present invention also relates to a tool which can easily be converted into other useful tools such as an indexing head to set a work piece at standard angles, a collet holder for use with machines such as a vertical milling machine or a surface grinder, or a dresser for use with a grinding wheel.

10 Claims, 10 Drawing Figures

UNIVERSAL MULTIPLE ANGLE WORK PIECE HOLDER WITH MULTIPLE TOOL CONVERSION FEATURES

BACKGROUND OF THE INVENTION

1. Field of the Invention

The present invention relates to an improved Universal Multiple Angle Work Piece Holder which is capable of setting an object at any desired compound angle so that the object may be machined at any desired location. The invention further relates to an apparatus which can be securely adjusted in a manner that provides a firm support for the object to be machined and provides an angle adjustment design which allows the object to be machined to be adjacent the center lines of the Universal Multiple Angle Work Piece Holder. The present invention also relates to a tool which can easily be converted into other useful tools such as an indexing head to set a work piece at standard angles, a collet holder for use with machines such as a vertical milling machine or a surface grinder, or a dresser for use with a grinding wheel.

2. Description of the Prior Art

In general, the present invention relates to tools which are commonly known as swivel vises. A swivel vise is a tool which is capable of being rotated through a series of pivotally connected members such that the object which is held by the tool can be set at any desired compound angle. Since the general coordinates which are set by this tool are spherical coordinates, the tool is also known as a 3-way angle vise.

The general concept of the swivel vise or 3-way angle vise is known in the prior art. U.S. Pat. No. 2,432,058 issued to Wiken et al. for a Machine Tool discloses a tool holder which comprises a base member adapted to be adjustably clamped on the work table of a conventional surface grinder; a vise unit or tool clamp proper, adapted to present the work to the wheel; and a plurality of intermediate support units or swivel members which provide a universally adjustable mount for the tool holder. By reason of the number of units employed, it is possible to set up any compound angle by adjusting the members individually to the components of the angle or to the individual angles locating the surface to be ground. Although the general concept of the swivel vise or 3-way angle vise is disclosed in the Wiken patent, the elements of the tool are fit together in a fashion such that they form cantilever arms. As a result, the object which is held and worked on is well off center. This presents several major problems. First, the presence of the grinding wheel or other machine tool working on the object sets up a substantial bending moment on the plurality of intermediate support units which are connected to each other in a pivot or beam like fashion. As a result, it is very easy for the tool to break in one of several locations under normal stress conditions created by the grinding wheel or other operating machine. Second, since the object to be operated on is held well off center, any slight change in any of the intermediate support elements throws the entire set angle off and the entire set of intermediate support elements must be readjusted to achieve the new desired compound angle. This results in a time consuming operation. In addition to the above mentioned defects, the tool disclosed in the Wiken patent has thin bolts interconnecting each part. This, accompanied by the substantial beam like interconnecting design, makes the vise design inherently weak, resulting in a tool which can easily break at numerous different points.

U.S. Pat. No. 2,444,727 issued to Bush discloses a tool whose principal object is to provide a support for a vise, clamp or other work holding medium, adapted to be affixed to a table or bench and which consists of superimposed, cylindrical elements, the upper of which constitutes or carries the work holding means and is capable of rotative and oscillative displacement with respect to the lower and supporting cylindrical element, in different positions thereon throughout a range of 180 degrees about a horizontal axis and 360 degrees on an axis perpendicular to said horizontal axis. As disclosed in FIG. 1, the design of the moving elements are inherently very weak. In both the upper and lower cylinders, the 180 degree movement is achieved by loosening one set screw and rotating the cylinder by the desired amount. This is an extremely weak adjustment and can easily slip if any transverse force is imparted to the object being machined. Since one small screw has to hold all of the cylinders and take the compound force from the machine, this tool can easily break or become bent at numerous locations along the length of the one screw.

U.S. Pat. No. 2,390,428 to Disse discloses a swivel vise which once again enables a piece of work supported by the vise to be presented in substantially any position to a cutting element. As shown in the various figures, especially FIGS. 1, 4, and 6, the design has many of the same inherently weak features as the Wiken patent. The moving elements are locked by small screws and are separated by significant lengths such that forces imparted to one end of an element are multiplied by the bending moment along the length of a member. It is therefore extremely easy for a screw to slip under the heavy pressure imparted to the object held and being worked on by the operating machine such as a milling machine. This could necessitate costly reworking of a part. The inherently weak design also has a lot of areas where parts of the tool can break.

U.S. Pat. No. 3,680,268 issued to Lorton discloses a swivel vise tool which has many of the same inherently weak features of previous swivel vise designs discussed above. As shown in FIGS. 6, 7 and 8, each element is locked in place by a small screw and has a significant length along which a bending moment from a transverse force at one end can be multiplied. As with the Wiken design, the object to be worked on is off center and a slight movement in one element necessitates readjusting all of the elements. Therefore, as with the other prior art tools, it is easy for an element to move during operation thereby ruining the object being worked on. Further, due to this inherently weak design, there are numerous areas where a part of the tool can break under stress.

A more primitive form of multiple angle vise is disclosed in U.S. Pat. No. 1,414,970 issued to Nelson. An example of a very complex universally adjustable multi-angle tool for workholders is disclosed in U.S. Pat. No. 2,509,338 issued to Elliott et al. This is an extreme example of a tool with multiple shaft elements which provide numerous weak areas at the multiple joints where the tool can break under stress. Once again, the object being held is well off center and any slight adjustment requires readjusting most of the elements of the tool. Both of these patents disclose movement performed by means of a crank.

Finally, U.S. Pat. No. 4,140,307 issued to Dalmau et al. is another example of a multiple angle vise wherein rotation to different compound angles is achieved through a multiplicity of ball and socket arrangements.

Therefore, all of the prior art designs for swivel vises or 3-way angle vises have weak interconnecting means which can cause an adjustment to slip thereby ruining the part being held and worked on. All of the prior art designs also have inherently weak designs because of the beam like interconnections which serve to set up numerous high stress areas resulting from the force imparted to the object being worked on.

In addition to the above enumerated common defects, the prior art tools also disclose arrangements wherein each desired element of the compound angle must be individually set, with no rapid adjustment to set commonly used angles such as 30 degrees, 45 degrees, 60 degrees and 90 degrees. Further, the designs disclose an arrangement wherein the part being worked on is substantially off center. Therefore, a minor adjustment in one of the elements usually necessitates readjusting everything. Therefore, the designs in the prior art necessitate a time consuming adjustment process to achieve the desired compound angle and a time consuming readjustment process if any modification in a setting is required.

In addition to the above common defects, the prior art tools do not disclose any features which would enable the tool to be converted into any other tool such as an indexing head, a collet holder or a dresser.

SUMMARY OF THE PRESENT INVENTION

The present invention incorporates a novel and nonobvious design for a Universal Multiple Angle Work Piece Holder which creates a very strong tool that can withstand a substantial transverse, vertical, or multidirectional force imparted to the object being held by the work piece holder from a tool such as a vertical milling machine, a surface grinding machine or a drill press. The present invention also incorporates a novel design for a multiple angle work piece holder which permits the object or work piece being held and worked on to be substantially along the three axis centerlines of the work piece holder and adjacent the center of gravity of the work piece holder so that a required angle adjustment can be made with ease and not require time consuming resetting of all of the movable elements of the tool. This feature in conjunction with the unique design of the rotating shafts of the work piece holder assures that substantial transverse forces applied to the work piece will not be multiplied by any long distance to a joint or other area of the work piece holder to create a bending moment. The present invention also incorporates a novel means for rapidly setting commonly used angles such as 30 degrees, 45 degrees, 60 degrees and 90 degrees so that the desired compound angle can be rapidly produced. The present invention also incorporates a novel design which permits the tool to be converted from a multiple angle work piece holder to several other useful tools such as an indexing head, a collet holder for use with machines such as a vertical milling machine or a surface grinder, or a dresser for use with a grinding wheel.

It has been discovered, according to the present invention, that if the cylindrical shafts along which the Universal Multiple Angle Work Piece Holder rotates are thick relative to the length and the entire diameter of the swivel member being rotated, the inherent design of the tool is such that no swivel member is substantially off center. As a result, no swivel member is formed as a beam along which a substantial bending moment can be imparted from the forces generated by the operating tool such as a surface grinder. This design crates a tool of superior strength which is able to withstand substantial forces from any compound angle direction.

It has also been discovered, according to the present invention, that if the rotating swivel members of the Universal Multiple Angle Work Piece Holder are designed such that the object being held is adjacent the three axis centerlines of the tool and also in line with or adjacent the center of gravity of the tool, minor changes in compound angles can be easily achieved without the necessity of resetting all of the angles in great detail. This design also lends strength to the tool and enables it to withstand substantial forces from the operating tool since the forces are concentrated adjacent the center of gravity of the Universal Multiple Angle Work Piece Holder.

It has further been discovered, according to the present invention, that if the base of the Universal Multiple Angle Work Piece Holder is designed so as to incorporate a vertical member which acts as the tool's main support, the tool can easily be converted into a multiplicity of other useful tools such as an indexing head, a collet holder, or a dresser.

It is therefore an object of the present invention to provide a Universal Multiple Angle Work Piece Holder which is capable of setting an object at any desired compound angle so that the object may be machined at any desired location.

It is another object of the present invention to provide a Universal Multiple Angle Work Piece Holder which has an inherently strong design that avoids having any of the rotating or swiveling members substantially off center to thereby avoid a substantial bending moment to occur which would allow the tool to break at numerous locations.

It is a further object of the present invention to provide a Universal Multiple Angle Work Piece Holder which is designed so that the object being held is substantially along the three axis centerlines of the tool and also in line with or adjacent the tool's center of gravity, to thereby allow for a firm support to withstand substantial forces and to also permit easy adjustment to alternative compound angle settings.

It is still another object of the present invention to provide a tool which can rapidly and easily be converted into a multiplicity of other useful tools such as an indexing head, a collet holder and a dresser.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation there is illustrated:

DETAILED DESCRIPTION OF THE PREFERRED EMBODIMENT

Figure 1:
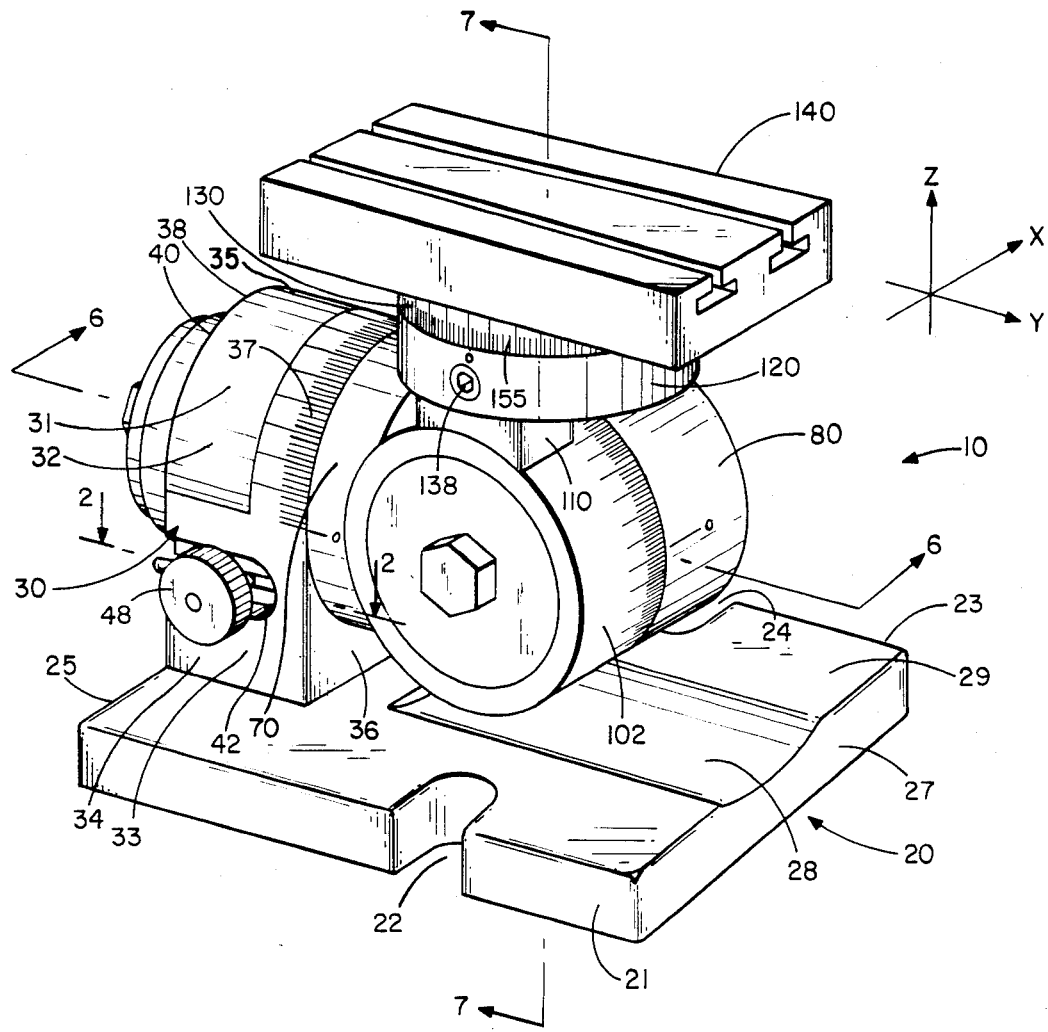
FIG. 1 is a perspective view of the Universal Multiple Angle Work Piece Holder looking from the left side.

With reference to the drawings of the invention in detail and more particularly to FIG. 1, there is shown at 10 the preferred embodiment of the Universal Multiple Angle Work Piece Holder. As shown in the perspective view looking from the left of FIG. 1, the tool consists of four interconnected components which are movably and rotatably interconnected. The first component is a base member 20. The base member 20 has two lengthwise edges 21 and 23 respectively and two widthwise edges 25 and 27. The base member 20 also contains an upper surface 29. The base member 20 includes means through which the base member 20 can be removably attached to a surface such as a bench, table, or the worktable of a machine such as a vertical milling machine, surface grinding machine, or drill press. As shown in FIG. 1, the attachment means are recesses 22 and 24 on opposite sides 21 and 23 of the lengthwise edges of the base member 20. The recesses 22 and 24 extend through the entire thickness of the base member 20. Attachment members such as bolts (not shown) can be passed through recesses 22 and 24 and used to attach the base member 20 to a bench, table, or worktable of a vertical milling machine, or drill press.

Figure 6:
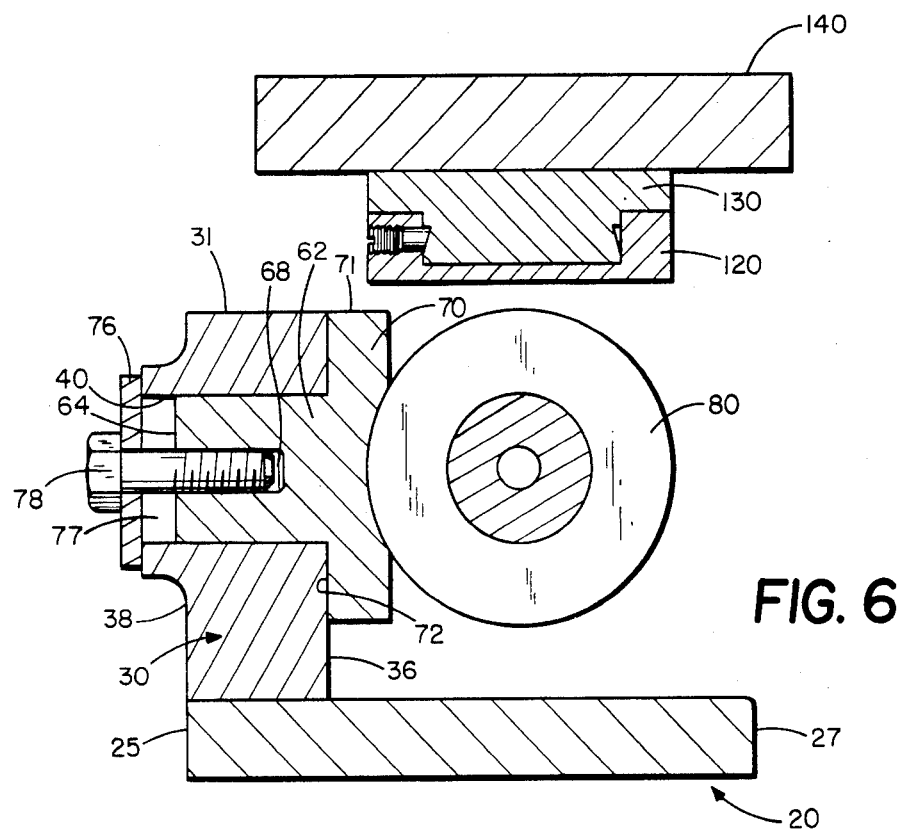
FIG. 6 is a cross-sectional view taken along line 6—6 of FIG. 1.

Rigidly attached to the upper surface 29 of the base member 20 and integral therewith is a support member 30. Referring to FIG. 6 as well as FIG. 1, the support member 30 has an upper portion 32 and a lower portion 34. Both portions have a common vertically disposed flat forward face 36 and a vertically disposed rearward face 38 as shown in FIG. 6. This rearward face 38 extends radially outward. The upper portion 32 has a curved upper surface 31 in the shape of a 180 degree arc. The lower portion 34 has two substantially vertically disposed sides 33 and 35 respectively. The support member 30 is designed to be short, compact and thick relative to the base 20, in order to provide a strong supporting means. The lower portion of rear face 38 of support member 30 is substantially parallel to the rear widthwise edge 25 of the base 20, and is positioned so as to be approximately centered along that widthwise edge. The support member 30 contains a transverse cylindrical hole 40 which extends through the entire thickness of support member 30 and having its axis disposed in a substantially horizontal direction. The horizontally disposed cylindrical hole 40 is located at approximately the midpoint of the upper section 32.

Figure 2:
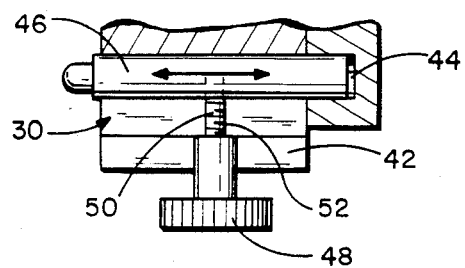
FIG. 2 is a partial cross-sectional view taken along line 2—2 of FIG. 1.

Located along one vertically disposed side 33 is a horizontally disposed recess 42. As shown in FIG. 1, the recess 42 extends through rearward face 38 but does not extend as far as the forward face 36. The lower portion 34 also contains a horizontally disposed cylindrical hole 44 which is substantially parallel to recess 42 but spaced apart from it by a portion of the support member 30. The partial cross-sectional view of FIG. 2 shows the relationship of the horizontally disposed cylindrical hole 44 to the recess 42. The horizontally disposed cylindrical hole 44 accommodates a movable rod 46 which can slide within the hole 44. The hole 44 extends through the entire thickness of the support member 30 and therefore the rod 46 can protrude through the forward face 36 or the rearward face 38. The rod 46 is tightened by means of a transverse headed bolt 48. The tip 50 of the transverse headed bolt 48 passes through a channel 52 between the cylindrical hole 44 and the recess 42, and abuts the rod 46 to thereby tighten it in place. The rod 46 can therefore be permitted to move in a horizontal direction so that its forward position can protrude through the forward face 36 of the support member 30 and its rearward portion can protrude through the rearward face 38 of the support member 30. The diameter of the rear portion of rod 46 is reduced so that it can fit into holes in an indexing head.

The upper surface 29 of the base member 20 contains a groove 28 which extends inwardly from its forward face 27 and is spaced apart from the forward face 36 of support member 30.

The curved upper surface 31 of support member 30 contains a degree scale 37 of 180 degrees, with 0 at the uppermost portion of upper section 32 and the scale extending for 90 degrees in either direction.

Figure 3:
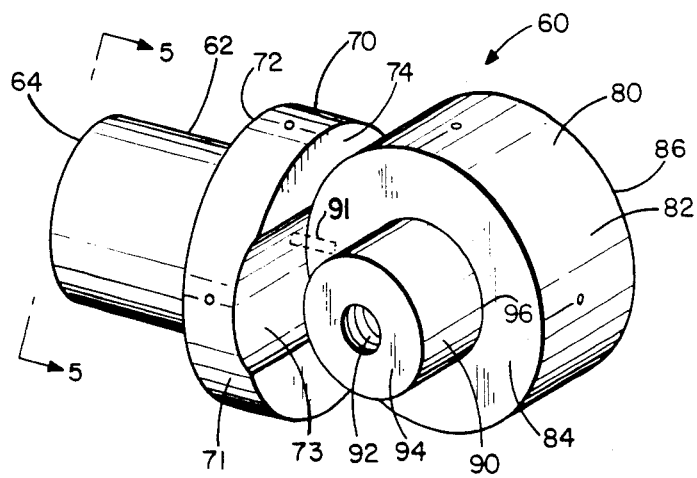
FIG. 3 is a perspective view of the first swivel member of the Universal Multiple Angle Work Piece Holder looking from the left.

A perspective view of the first swivel member 60 is shown in FIG. 3. First swivel member 60 is of one piece construction but contains four very distinct sections; first section 62, second section 70, third section 80 and fourth section 90. The first section 62 is a horizontally disposed solid cylinder containing a flat rear face 64 and a flat front face 66 (not shown). As shown in FIG. 6, first section 62 contains a threaded internal cylindrical opening 68 which extends inwardly from rear face 64. The threaded internal cylindrical opening 68 can accommodate the threaded shaft of a bolt.

The second section 70 is a horizontally disposed solid cylinder whose diameter is greater than the first section 62 but whose thickness is substantially less than the first section 62. Second section 70 has a rear face 72 and a front face 74. The rear face 72 of second section 70 is integral with the front face 66 of first section 62 such that both sections share a common horizontal axis. As shown in FIG. 6, central transverse hole 40 in support member 30 is designed to accomodate first section 62 of first swivel member 60. When so inserted, the circumference 71 of second section 70 is parallel to the upper arc surface 31 of support member 30. The central portion of front face 74 contains a concave surface 73 while the balance of front face 74 is substantially flat. First swivel member 60 is locked inside support member 30 by a threaded bolt 78. The bolt 78 is screwed into a disc 76 which abuts the outwardmost portions of rear face 38 of support member 30. The threaded bolt is screwed into threaded internal cylindrical opening 68 of first section 62. A gap 77 is left between the disc 76 and the rear face 64 of first section 62. This gap 77 is required in order to assure that first swivel member 60 can be tightened properly.

Figure 5:
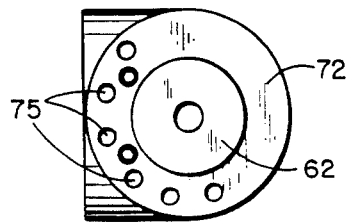
FIG. 5 is a partial rear view of the first swivel member looking from line 5—5 of FIG. 3.

As shown in FIG. 5, the rear face 72 of said second section 70 contains a multiplicity of inwardly extending holes 75 positioned at various degrees from the horizontal such as 30 degrees, 45 degrees, 60 degrees and 90 degrees. The holes are designed to be aligned with and accommodate the protruding forward end of rod 46. Through this combination, the first swivel member 60 can be quickly rotated relative to the support member 30 to a commonly used angle such as 30, 45, 60 or 90 degrees and quickly locked in place by use of the headed bolt 48 sliding the forwardly protruding end of rod 46 into the appropriate hole.

Third section 80 is also a solid cylinder whose axis is substantially perpendicular to the common axis of first section 62 and second section 70. One portion of the circumference 82 of third section 80 is rigidly attached to the concave portion 73 of front face 74 of second section 70. The cylindrical third section 80 contains a substantially flat front face 84 and a substantially flat rear face 86. Third section 80 is attached to second section 70 such that rear face 86 is substantially parallel to one portion of the circumference 71 of second section 70.

Fourth section 90 is also a solid cylinder which extends from the front face 84 of third section 80. Fourth section 90 and third section 80 share a common axis. The fourth section 90 contains a front face 94 and a rear face 96. The rear face 96 is attached to front face 84 of third section 80. The front face 94 contains a threaded cylindrical opening 92 which can accommodate the threaded shaft of a bolt.

In an alternative embodiment, first swivel member 60 can be made of two piece construction. In this embodiment, first section 62 and second section 70 are of one piece construction and third section 80 and fourth section 90 are of one piece construction, and they are joined at the locations of the second section 70 to the third section 80 as described above by means 91 shown in phantom in FIG. 4.

Figure 4:
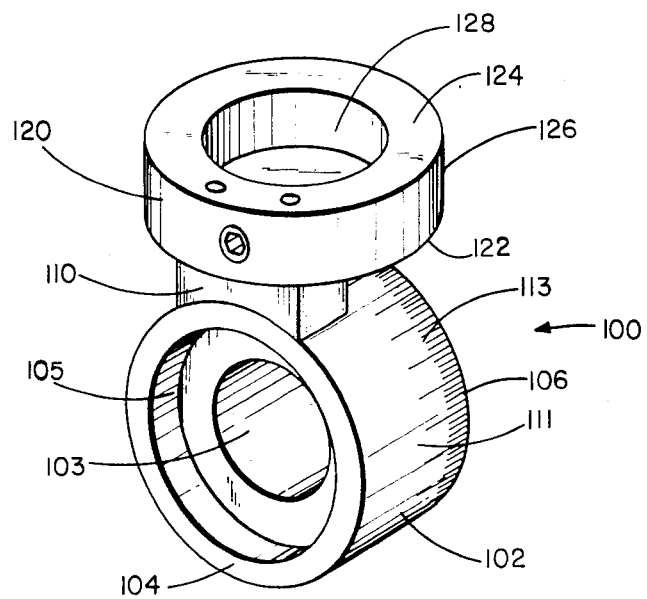
FIG. 4 is a perspective view of the second swivel member of the Universal Multiple Angle Work Piece Holder looking from the left.
Figure 7:
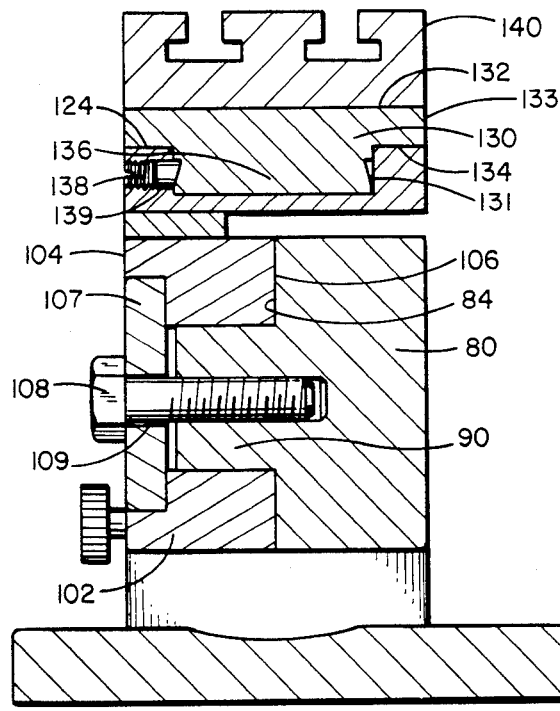
FIG. 7 is a cross-sectional view taken along line 7—7 of FIG. 1.

A perspective view of second swivel member 100 is shown in FIG. 4. Second swivel member 100 is of one piece construction but contains three distinct sections; fifth section 102, sixth section 110, and seventh section 120. Fifth section 102 is a torroidal cylinder whose outer diameter is substantially the same as the outer diameter of third section 80. The interior of fifth section 102 contains a central opening 103 which is designed to accommodate the cylindrical fourth section 90 of first swivel member 60. In the embodiment shown, the front face 104 of fifth section 102 contains a recess 105. This recess accommodates a disc 107 (shown in FIG. 7). The disc 107 contains a central opening 109. As shown in FIG. 7, fifth section 102 is movably connected to fourth section 90 by threaded bolt 108 which is passed through cylindrical opening 109 in disc 107 and thread through threaded cylindrical opening 92 in fourth section 90. When so joined, the rearward face 106 of fifth section 102 abuts the front face 84 of third section 80 and also encircles fourth section 90 which is thereby contained within fifth section 102. Bolt 108 abuts the forward portion of disc 107 which is parallel to the front face 104 of fifth section 102. The circumference 111 of fifth section 102 contains a degree scale 113 adjacent its rear face 106. The scale is divided into 360 degrees with 0 located at the upper portion when the axis of fifth section 102 is horizontal. In an alternative embodiment, the disc 107 can be eliminated and that portion is contained within a solid portion of fifth section 102.

Rigidly attached to the circumference 111 of fifth section 102 and adjacent its front face 104 is sixth section 110. Sixth section 110 is a mating member which joins fifth cylindrical section 102 to seventh cylindrical section 120.

Seventh section 120 is a solid cylinder whose axis is approximately perpendicular to the axis of third section 80 and fifth section 102. When the axes of the latter two sections are horizontally disposed, the axis of seventh section 120 is vertically disposed. Seventh section 120 contains a substantially flat lower face 122 and a substantially flat upper face 124. Fifth section 102 and seventh section 120 are joined by sixth section 110 such that a portion of the circumference 126 of seventh section 120 is substantially parallel to the front face 104 of fifth section 102. Seventh section 120 extends over all of fifth section 102 and a portion of third section 80. Seventh section 120 contains a deep cylindrical recess 128 which begins at upper face 124 and extends through most of the thickness of seventh section 120.

As shown in FIG. 1, FIG. 6 and FIG. 7, third swivel member 130 is a solid cylinder which contains an upper face 132 and a lower face 134. Integral with lower face 134 and extending from it is a substantially cylindrical stem 136 which flares slightly outwardly along its lower portion. The cylindrical stem 136 is accomodated by the deep recess 128 in seventh section 120. Lower face 134 in eighth section 130 thereby abuts upper face 124 in seventh section 120. The outer diameter of both sections is substantially the same. The circumference 133 of third swivel member 130 contains a degree scale 155 which has 360 degrees marked on it. Third swivel member 130 can thereby rotate within seventh section 120. Third swivel member 130 can be held rigid by means of a transverse screw 138 which extends through a threaded opening 139 in seventh section 120. The tip of the transverse screw abuts the surface 131 of cylindrical stem 136.

The holding member 140 which grips the object being worked on is rigidly attached to the upper face 132 of third swivel member 130 by means of screws (not shown) or other comparable means. In FIG. 1, the holding member 140 shown is a slide table. This can be replaced by numerous other gripping members such as a vise.

The above description is very detailed. Described in more general terms, the present invention is a Universal Multiple Angle Work Piece Holder 10 for positioning a work piece holding member 140 and work piece held therein above a flat supporting surface at any selected angular position in each of three planes. The work piece holder 10 comprises a flat base member 20 adapted to rest upon a flat supporting surface and a support member 30 fixedly secured to one edge of said base member 20 and extending vertically upward therefrom. The work piece holder 10 further comprises a first swivel member 60 positioned beside said support member 30 and containing a first shaft or cylinder 62 extending parallel to said base member 20 and rotatably supporting the first swivel member 60 from the support member 30. The first swivel member 60 is spaced a sufficient distance above the base member 20 so as not to directly engage the base member 20 when rotated upon first shaft 62. The work piece holder 10 further comprises a second swivel member 100 disposed partially along a parallel plane with said first swivel member 60 and partially extending above said first swivel member 60 and substantially above the horizontal center of said base member 20. The first swivel member 60 further contains a second shaft or cylinder 90 perpendicular to said first shaft 62 and rotatably supporting said second swivel member 100. A third swivel member 130 is secured to the outer extremity of said second swivel member 100 which is remote from said first swivel member 60. Said third swivel member 130 also contains a shaft 136 extending perpendicular to said second shaft 90 and within said second swivel member 100 such that said second swivel member 100 rotatably supports said third swivel member 130 from said second swivel member 100. There are circular scale markings associated with said support member 30 and with said second and third swivel members respectively for indicating the respective position settings thereof.

Finally, there are means carried by the outer extremity of the third swivel member 130 for securely supporting the work piece holding member 140 and associated work piece contained therein, whereby the work piece holding member 140 and work piece contained therein may be selectively supported at any three-dimensional angular position relative to said base member 20 and when thus supported is positioned above the approximate center of gravity of the work piece holder 10.

The present invention incorporates a unique design wherein the shafts or cylinders about which the various components rotate are relatively thick in diameter as compared to their length. This provides a very strong rotating support which does not have the inherent weaknesses of prior art multiple angle tools. There are no relatively long dimensions between rotating joints (where two rotating components come together) which permits a bending moment force to be imparted to a joint by means of the force imparted to the workpiece held by the work piece holding member 140 by the tool such as a vertical milling machine, surface grinding wheel, or drill press.

Another unique feature of the design of the present invention is that the rotating members, namely the first, second and third swivel members are aligned relative to each other such that the workpiece held by the work piece holding member 140 is positioned at or near the centerlines of the Universal Multiple Angle Work Piece Holder 10 and above the approximate center of gravity of the work piece holder 10. Therefore, the present invention can easily absorb far greater forces imparted from the moving tool. Furthermore, it can readily accommodate adjustments of one rotating element without the necessity for extensive realigning of all three swivel members. For example, in Wiken U.S. Pat. No. 2,432,058, the entire tool is hinged off center. Any change requires extensive changes in all components. In the present invention, the object being worked on is adjacent the tool's centerlines, so a change of one component doesn't require extensive changes in all of the angular components.

In the preferred embodiment, the dimensions of the various components of the Universal Multiple Angle Work Piece Holder 10 are as follows. It is emphasized that these are approximate dimensions and furthermore are for illustrative purposes and in no way are intended to limit or restrict the spirit or scope of the present invention. In the preferred embodiment, the outer diameter of the main cylinders will all be the same and will be approximately three and one-quarter ($3\frac{1}{4}$) inches. The main cylinders and diameters are: the diameter of the upper section 32 of support member 30, and the diameter of second section 70 and third section 80 of first swivel member 60, the diameter of fifth section 102 and seventh section 120 of second swivel member 100, and the diameter of third swivel member 130. As previously pointed out, the diameters of the rotating shafts will be relatively thick compared to their lengths. For first section 62 of first swivel member 60, the outer diameter will be approximately one and three-quarter ($1\frac{3}{4}$) inches while its length will be approximately one and five-eighths ($1\frac{5}{8}$) inches. For fourth section 90 of first swivel member 60, the outer diameter will be approximately one and one-half ($1\frac{1}{2}$) inches while its length will be approximately one and one-eighth ($1\frac{1}{8}$) inches. The outermost diameter of stem 136 will be approximately two (2) inches while its thickness or height will be approximately three-quarters ($\frac{3}{4}$) of an inch. The height of support member 30 from the base 20 will be approximately three and five-eighths ($3\frac{5}{8}$) inches. The depth groove 28 in base 20 will be approximately two hundred thousands (200/1000) of an inch. The height of sixth section 110 at the shortest distance between the fifth section 102 and seventh section 120 will be approximately three-eighths ($\frac{3}{8}$) of an inch. By way of example only, the base 20 can be three-quarters ($\frac{3}{4}$) of an inch thick and six (6) inches square.

In operation, the work piece is held by work piece holding member 140 which is fixed to the upper surface 124 of third swivel member 130. Any desired compound angle for spherical coordinates can be set so that the work piece can be presented to the machine at the desired angle. With standard X-Y-Z coordinates, one vertical or Z-X coordinate is set by rotating second section 70 the desired amount as indicated on the degree scale 37 along surface 31 of support member 30. As previously mentioned, commonly used angles such as 30, 45, 60, or 90 degrees can be set by using the holes 75 in second section 70 and rod 46 in the support member 30. Also, the dimensions are such that third section 80 and fifth section 100 will pass within groove 28 of the base member 20 at their maximum extension. The first section 62 of first swivel member 60 is then tightened by bolt 78.

The second vertical or Z-Y coordinate is set by rotating fifth section 100 relative to third section 80. The rotating cylinder which is fourth section 90 is loosened by means of bolt 108 and after the desired angle is achieved, the bolt 108 is then tightened. The measurement is taken along degree scale 113 along surface 111 of fifth section 100. A "0" marker is positioned on the surface 82 of third section 80 to indicate relative rotational movement.

Finally, the horizontal or X-Y coordinate is set by rotating third swivel member 130 by the desired amount. This section is permitted to rotate by loosening transverse screw 138 and then tightening it after the desired rotation has been achieved.

Due to the inherent design exemplified by the dimensions previously set forth, the work piece held by the work piece holding member 140 can be positioned at any angle but still is positioned close to the centerlines or axes of the Universal Multiple Angle Work Piece Holder 10 and also adjacent its center of gravity lines. Further, the dimensions of having a substantial diameter rotating member (sections 62, 90 and 136) and large diameter relative to their length provides a very strong tool since there are no elongated sections along which a substantial bending moment can be set up from the force generated by the working tool on the work piece. Further, the compact design with abutting sections approximates a sphere and further increases the strength and durability of the Universal Multiple Angle Work Piece Holder. The present invention can be manufactured out of steel or any other strong metal such as titanium, or any other durable alloy.

The Universal Multiple Angle Work Piece Holder 10 can be used in conjunction with a multiplicity of tools such as a vise. The vise would be supported by the third swivel member 130 and would be in place of the slide table 140 shown in FIG. 1. In terms of rotational movement, the tool can be used to rotate the vise to any desired compound angle. By way of example, the rotation in the Z-X axis could be one-half of a sphere, the rotation in the X-Y axis could be one-half of a sphere, and the rotation in the Z-Y axis could be one-quarter of a sphere. The vise, in turn, would be used to grip the product being worked on and presented to the operating machine.

The Universal Multiple Angle Work Piece Holder is also a tool holder and is designed to hold tools for grinding down a grinding wheel, or to shape a tool for cuts on a milling machine. The slide table 140 in FIG. 1 can be replaced with many different types of tool holders.

Figure 8:
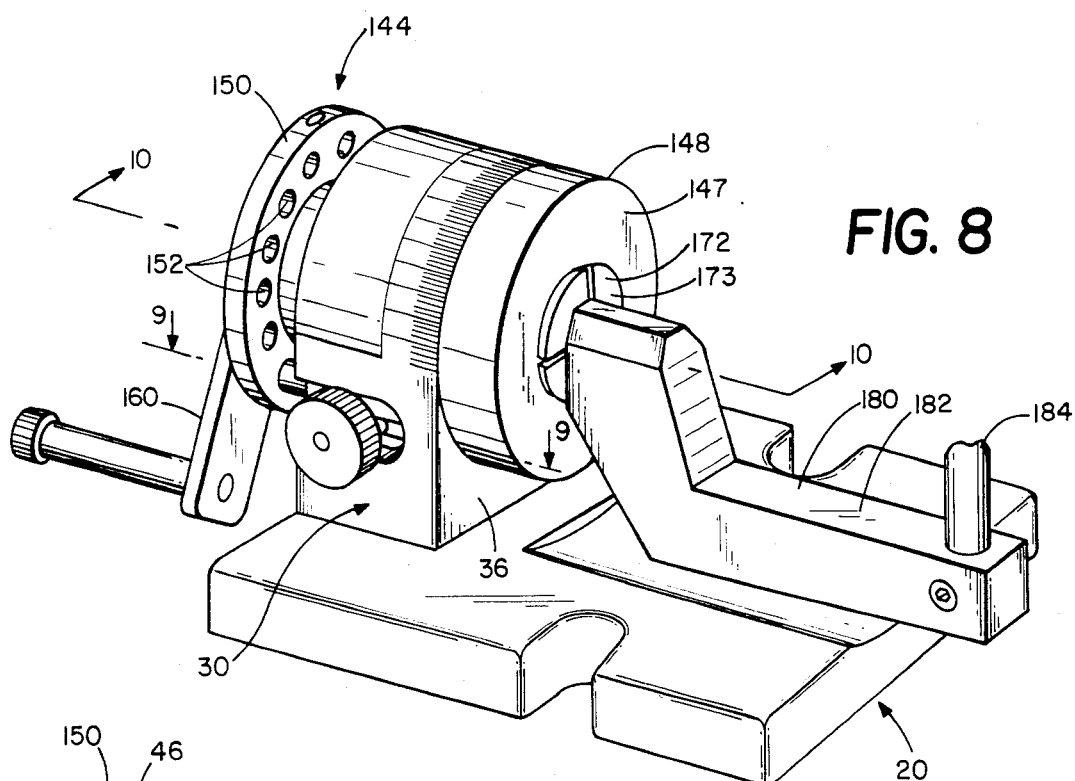
FIG. 8 is a perspective view of the present invention looking from the left side after it has been converted into an indexing head, collect holder and dresser.
Figure 9:
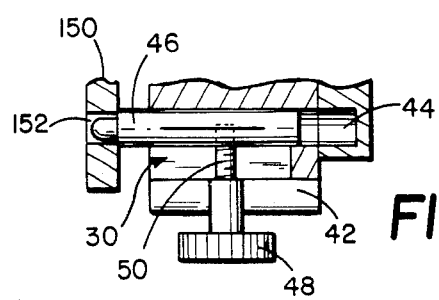
FIG. 9 is a partial cross-sectional view taken along line 9—9 of FIG. 8.
Figure 10:
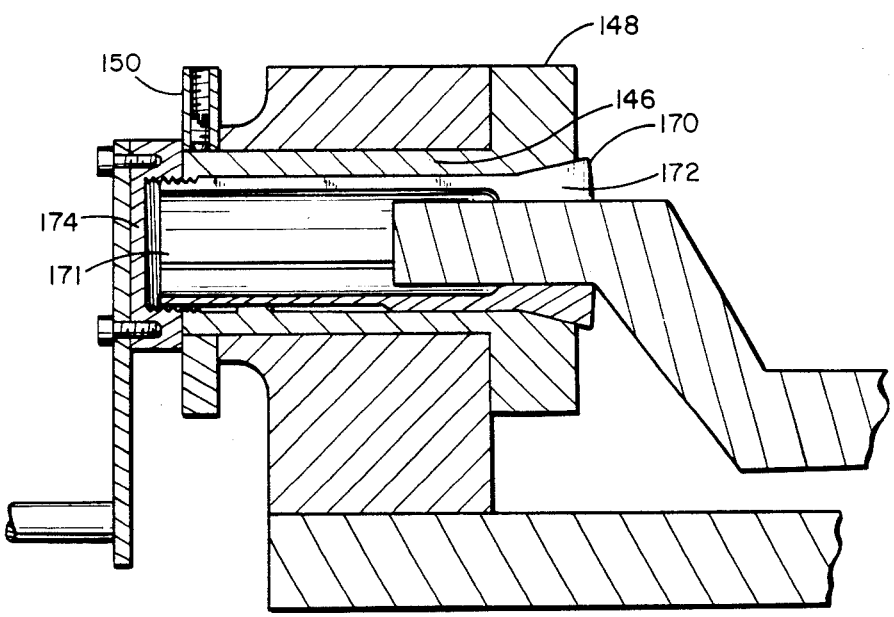
FIG. 10 is a cross-sectional view taken along line 10—10 of FIG. 8.

Another unique feature of the present invention is the ability to quickly and efficiently convert the tool 10 from a multiple angle work piece holder into several other useful tools such as an indexing head, a collet holder and a dresser. Examples of this conversion feature are shown in FIG. 8, FIG. 9 and FIG. 10.

The tool is converted by removal of first swivel member 60 from support member 30. This automatically removes second swivel member 100 and third swivel member 130, thereby leaving only the base 20 and the attached first support member 30. The tool can be converted into an indexing head 144 as follows. A hollow shaft 146 is placed through hole 40 in support member 30. The front end of the shaft contains a wider diameter collar 148 which abuts the front face 36 of support member 30. The rear end of the shaft 146 can be threaded to accommodate a threaded indexing wheel 150. The indexing wheel 150 can abut the outwardly protruding portion of rear face 38 of support member 30. The indexing wheel 150 has a multiplicity of holes 152 which correspond to all of the standard degrees such as 15, 30, 45, 60, 75, 90 etc. The object to be worked on is held within the shaft 146 and can be quickly rotated to any of the desired degree angles corresponding to the holes 152 in the indexing wheel 150. For convenience, handle member 160 can be attached to the indexing wheel 150, to assist in ease of turning the object to the desired degree. As shown in FIG. 8 and in the detailed cross-sectional view of FIG. 9, rod 46 in support member 30 can now be used to protrude through rear face 38 in support member 30 and to fit into a corresponding one of the holes 152 so that the object to be worked on is set at the appropriate angle. The rod is once again moved into place by transverse headed bolt 48. This assures rapid indexing at appropriate angles for work pieces held in this manner.

The tool can also be used as a collet holder 170 by insertion of the collet or chuck 172 into hollow shaft 146. A rear face plate 174 is screwed onto the threaded end 171 of the collet 170 to hold it firmly in place. For convenience, the indexing wheel 150 and handle member 160 can be used in conjunction with the collet holder 170, as shown in FIG. 8. Through this combination, the indexing wheel 150 can be used in conjunction with the collet or chuck 172 so that the collet holder 170 can be rapidly rotated to the desired preset angles and then quickly set by use of rod 46 placed into the appropriate one of holes 152. The gripping end 173 of collet or chuck 172 protrudes through the front face 147 of wider diameter collar 148. The collet holder 170 can be used to preset any desired object to be held within the collet 172 to any machine such as a vertical milling machine, a surface grinding machine or a drill press.

Finally, the above tool can be converted into a dresser for use in grinding or sharpening tools such as a grinding wheel. The dresser 180 consists of dresser shaft 182 which is held within collet 172 and a diamond cutter 184, held at the protruding end of dresser shaft 182. The grinding wheel is thereby placed against the diamond cutter 184 to thereby sharpen it.

The unique design of the base 20 and support member 30 therefore permit easy conversion of the tool 10 into a multiplicity of other useful tools for use with machinery commonly found in a machine shop.

Of course, the present invention is not intended to be restricted in any particular form or arrangement, or any specific embodiment disclosed herein, or any specific use, since the same may be modified in various particulars or relations without departing from the spirit or scope of the claimed invention hereinabove shown and described of which the apparatus and methods shown are intended only for illustration and for disclosure of an operative embodiment and method of manufacture and not to show all of the various forms of modification in which the invention might be embodied or manufactured.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A Multiple Angle Work Piece Holder assembly for positioning a work piece holding member and work piece held therein above a flat supporting surface at any selected angular position in each of three planes, comprising:

(a) a base member adapted to rest upon a flat supporting surface;

(b) said base member containing a multiplicity of edges and an upper and lower surface;

(c) a support member rigidly attached to the upper surface of said base member and adjacent its rear edge, and extending vertically upward therefrom;

(d) the lower portion of said support member containing two substantially vertically disposed sides which extend into a curved upper area which terminates in a 180 degree arc;

(e) said support member further comprising a substantially flat front face and a rear face which extends radially outward;

(f) said support member further comprising a transverse cylindrical opening which extends through the entire thicknss of said support member and having its axis disposed in a substantially horizontal direction;

(g) said support member further comprising a horizontally disposed recess along one of its vertically disposed sides, and further comprising a horizontally disposed hole running parallel to the recess and spaced apart from it and extending through the entire thickness of the support member;

(h) a movable rod contained within the horizontally disposed hole and capable of being slidably moved within the hole by means of a transverse bolt which extends from the horizontally disposed recess through a transverse opening and to the surface of the movable rod, whereby the rod can be caused to protrude through the front face and the rear face of the support member;

(i) a degree scale containing approximately 180 degrees placed upon the curved upper portion of the support member and adjacent its front face;

(j) a first swivel member positioned beside said support member;

(k) said first swivel member being of one piece construction and containing four distinct sections, a first section, a second section, a third section and a fourth section;

(l) said first section of said first swivel member being a horizontally disposed cylinder with a flat rear face a flat front face, the rear face containing a central threaded cylindrical opening which extends into the cylinder;

(m) the diameter of said first section being accommodated within said transverse cylindrical opening in said support member, whereby said first section rotatably supports said first swivel member from said support member and is locked in place by means of a threaded bolt extending into said threaded cylindrical opening in the first section;

(n) said second section of said first swivel member being a horizontally disposed solid cylinder whose diameter is greater than the diameter of the first section, the second section containing a rear face integral with the front face of said first section such that both sections share a common horizontal axis and wherein the circumference of the second section is parallel to the circumference of the arc portion of the support member;

(o) the rear face of said second section of said first swivel member containing a multiplicity of holes positioned at various degrees from the horizontal, and designed to be aligned with and accommodate a protruding forward end of said rod within said support member so that said first swivel member can quickly be set at a specific degree to the horizontal by insertion of said rod into one of the multiplicity of holes in the rear face of the second section of said first swivel member;

(p) the third section of said first swivel member being a solid cylinder whose axis is substantially perpendicular to the common axis of the first and second sections, and rigidly attached to the front face of the second section along a portion of its circumference, such that the rear face of the third section is substantially parallel to one portion of the circumference of the second section;

(q) the fourth section of said first swivel member being a solid cylinder extending from the front face of the third section such that they share a common axis, with the front face of the fourth section containing a threaded cylindrical opening extending into the cylinder;

(r) said first swivel member being spaced a sufficient distance above said base member so that its second, third and fourth sections will not directly engage the base member when the first swivel member is rotated upon the first section;

(s) a seacond swivel member positioned beside said first swivel member and rotatably supported from the fourth section of said first swivel member;

(t) said second swivel member being of one piece construction and containing three distinct sections; a fifth section, a sixth section and a seventh section;

(u) said fifth section of said second swivel member being a toroidal cylinder whose outer diameter is substantially the same as the outer diameter of said third section and whose circumference contains a degree scale of 360 degrees adjacent its rear face;

(v) the interior of said fifth section containing a central opening which is designed to accommodate the cylindrical fourth section of said first swivel member;

(w) said fifth section being thereby movably attached to said fourth section by means of a threaded bolt which extends from a front face of said fifth section into the threaded opening in said fourth section, whereby the rear face of said fifth section is adjacent the front face of said third section;

(x) said sixth section being a mating section and rigidly attached to the circumference of said fifth section and adjacent its front face, to thereby provide a connection and separation between the fifth section and the seventh section;

(y) said seventh section being a cylinder whose axis is approximately perpendicular to the axes of the first and fourth sections, and joined to the sixth section at a portion of its lower face such that a portion of the circumference of the seventh section is substantially parallel to a front face of the fifth section.

(z) said seventh section containing a deep cylindrical recess which begins at its upper face and extends through most of the thickness of the seventh section;

(aa) a third swivel member rotatably supported by the seventh section of said second swivel member;

(bb) said third swivel member being a solid cylinder whose diameter is substantially the same as the diameter of said seventh section, and containing a stem extending from its lower surface which is accommodated within the cylindrical recess of said seventh section and tightened within it by means of a transverse screw within a wall of the seventh section;

(cc) the circumference of said third swivel member containing a 360 degree scale adjacent its lower surface;

(dd) the upper surface of said third swivel member containing means to rigidly retain a work piece holder; and (ee) the diameter of the cylinders about which the swivel members rotate, which are the first and fourth sections of the first swivel member and the stem of the third swivel member being thick as compared to their lengths;

(ff) whereby the work piece holding member and work piece contained therein may be selectively supported at any three-dimensional angular position relative to said base by means of rotation of said swivel members with respect to each other and to said support member along their respective cylinders and in accordance with the degree scale markings.

2. The invention as defined in claim 1 wherein all of the components are made of steel.

3. The invention as defined in claim 1 further comprising:
(a) the head of said support member from the base is approximately three and five-eighths inches;
(b) the diameter of said first section is approximately one and three-quarters inches;
(c) the length of said first section is approximately one and five-eights inches;
(d) the diameter of said second section is approximately three and one-quarter inches;
(e) the diameter of said third section is approximately three and one-quarter inches;
(f) the diameter of said fourth section is approximately one and one-half inches;
(g) the length of said fourth section is approximately one and one-eighth inches;
(h) the diameter of said fifth section is approximately three and one-quarter inches;
(i) the diameter of said seventh section is approximately three and one-quarter inches;
(j) the diameter of said third swivel member is approximately three and one-quarter inches;
(k) the outer diameter of said stem on said third swivel member is approximately two inches; and
(l) the height of said stem is approximately three-quarters of an inch.

4. A Multiple Angle Work Piece Holder assembly for positioning a work piece holding member and work piece held therein above a flat supporting surface at any selected angular position in each of three planes, comprising:
(a) a base member adapted to rest upon a flat supporting surface;
(b) said base member containing a multiplicity of edges and an upper and lower surface;
(c) a support member rigidly attached to the upper surface of said base member and adjacent its rear edge, and extending vertically upward therefrom;
(d) the lower portion of said support member containing two substantially vertically disposed sides which extend into a curved upper area which terminates in a 180 degree arc;
(e) said support member further comprising a substantially flat front face and a rear face which extends radially outward;
(f) said support member further comprising a transverse cylindrical opening which extends through the entire thickness of said support member and having its axis disposed in a substantially horizontal direction;
(g) said support member further comprising a horizontally disposed recess along one of its vertically disposed sides, and further comprising a horizontally disposed hole running parallel to the recess and spaced apart from it and extending through the entire thickness of the support member;
(h) a movable rod contained within the horizontally disposed hole and capable of being slidably moved within the hole be means of a transverse bolt which extends from the horizontally disposed recess through a transverse opening and to the surface of the movable rod, whereby the rod can be caused to protrude through the front face and the rear face of the support member;
(i) a degree scale containing approximately 180 degrees placed upon the curved upper portion of the support member and adjacent its front face;
(j) a first swivel member positioned beside said support member;
(k) said first swivel member being of two piece construction and containing four distinct sections, a first section, a second section, a third section and a fourth section with the first and second section being of one piece construction and the third and fourth sections being of one piece construction;
(l) said first section of said first swivel member being a horizontally disposed cylinder with a flat rear face a flat front face, the rear face containing a central threaded cylindrical opening which extends into the cylinder;
(m) the diameter of said first section being accommodated within said transverse cylindrical opening in said support member, whereby said first section rotatably supports said first swivel member from said support member and is locked in place by means of a threaded bolt extending into said threaded cylindrical opening in the first section;
(n) said second section of said first swivel member being a horizontally disposed solid cylinder whose diameter is greater than the diameter of the first section, the second section containing a rear face integral with the front face of said first section such that both sections share a common horizontal axis and wherein the circumference of the second section is parallel to the circumference of the arc portion of the support member;
(o) the rear face of said second section of said first swivel member containing a multiplicity of holes positioned at various degrees from the horizontal, and designed to be aligned with and accommodate a protruding forward end of said rod within said support member so that said first swivel member can quickly be set at a specific degree to the horizontal by insertion of said rod into one of the multiplicity of holes in the rear face of the second section of said first swivel member;
(p) the third section of said first swivel member being a solid cylinder whose axis is substantially perpendicular to the common axis of the first and second sections, and attached to the front face of the second section along a portion of its circumference by fastening means, such that the rear face of the third section is substantially parallel to one portion of the circumference of the second section;
(q) the fourth section of said first swivel member being a solid cylinder extending from the front face of the third section such that they share a common axis, with the front face of the fourth section containing a threaded cylindrical opening extending into the cylinder;
(r) said first swivel member being spaced a sufficient distance above said base member so that its second, third and fourth sections will not directly engage the base member when the first swivel member is rotated upon the first section;
(s) a second swivel member positioned beside said first swivel member and rotatably supported from the fourth section of said first swivel member;
(t) said second swivel member being of one piece construction and containing two distinct sections; a fifth section and a sixth section;
(u) said fifth section of said second swivel member being a torroidal cylinder whose outer diameter is substantially the same as the outer diameter of said third section and whose circumference contains a degree scale of 360 degrees adjacent its rear face;

(v) the interior of said fifth section containing a central opening which is designed to accommodate the cylindrical fourth section of said first swivel member;

(w) said fifth section being thereby movably attached to said fourth section by means of a threaded bolt which extends from a front face of said fifth section into the threaded opening in said fourth section, whereby the rear face of said fifth section is adjacent the front face of said third section;

(x) said sixth section being a cylinder whose axis is approximately perpendicular to the axes of the first and fourth sections, and joined to the fifth section at a portion of its lower face such that a portion of the circumference of the sixth section is substantially parallel to a front face of the fifth section.

(y) said sixth section containing a deep cylindrical recess which begins at its upper face and extends through most of the thickness of the sixth section;

(z) a third swivel member rotatably supported by the sixth section of said second swivel member;

(aa) said third swivel member being a solid cylinder whose diameter is substantially the same as the diameter of said sixth section, and containing a stem extending from its lower surface which is accommodated within the cylindrical recess of said sixth section and tightened within it by means of a transverse screw within a wall of the sixth section;

(bb) the circumference of said third swivel member containing a 360 degree scale adjacent its lower surface;

(cc) the upper surface of said third swivel member containing means to rigidly retain a work piece holder; and (dd) the diameter of the cylinders about which the swivel members rotate, which are the first and fourth sections of the first swivel member and the stem of the third swivel member being thick as compared to their lengths;

(ee) whereby the work piece holding member and work piece contained therein may be selectively supported at any three-dimensional angular position relative to said base by means of rotation of said swivel members with respect to each other and to said support member along their respective cylinders and in accordance with the degree scale markings.

5. The invention as defined in claim 4 wherein all of the components are made of steel.

6. The invention as defined in claim 4 further comprising:

(a) the head of said support member from the base is approximately three and five-eighths inches;

(b) the diameter of said first section is approximately one and three-quarters inches;

(c) the length of said first section is approximately one and five-eights inches;

(d) the diameter of said second section is approximately three and one-quarter inches;

(e) the diameter of said third section is approximately three and one-quarter inches;

(f) the diameter of said fourth section is approximately one and one-half inches;

(g) the length of said fourth section is approximately one and one-eighth inches;

(h) the diameter of said fifth section is approximately three and one-quarter inches;

(i) the diameter of said seventh section is approximately three and one-quarter inches;

(j) the diameter of said third swivel member is approximately three and one-quarter inches;

(k) the outer diameter of said stem on said third swivel member is approximately two inches; and (l) the height of said stem is approximately three-quarters of an inch.

7. A Multiple Angle Work Piece Holder assembly for positioning a work piece holding member and work piece held therein above a flat supporting surface at any selected angular position in each of three planes, comprising:

(a) a base member adapted to rest upon a flat supporting surface;

(b) said base member containing a multiplicity of edges and an upper and lower surface;

(c) a support member rigidly attached to the upper surface of said base member and adjacent its rear edge, and extending vertically upward therefrom;

(d) the lower portion of said support member containing two substantially vertically disposed sides which extend into a curved upper area which terminates in a 180 degree arc;

(e) said support member further comprising a substantially flat front face and a rear face which extends radially outward;

(f) said support member further comprising a transverse cylindrical opening which extends through the entire thickness of said support member and having its axis disposed in a substantially horizontal direction;

(g) said support member further comprising a horizontally disposed recess along one of its vertically disposed sides, and further comprising a horizontally disposed hole running parallel to the recess and spaced apart from it and extending through the entire thickness of the support member;

(h) a movable rod contained within the horizontally disposed hole and capable of being slidably moved within the hole be means of a transverse bolt which extends from the horizontally disposed recess through a transverse opening and to the surface of the movable rod, whereby the rod can be caused to protrude through the front face and the rear face of the support member;

(i) a degree scale containing approximately 180 degrees placed upon the curved upper portion of the support member and adjacent its front face;

(j) a first swivel member positioned beside said support member;

(k) said first swivel member being of two piece construction and containing four distinct sections, a first section, a second section, a third section and a fourth section with the first and second section being of one piece construction and the third and fourth sections being of one piece construction;

(l) said first section of said first swivel member being a horizontally disposed cylinder with a flat rear face a flat front face, the rear face containing a central threaded cylindrical opening which extends into the cylinder;

(m) the diameter of said first section being accommodated within said transverse cylindrical opening in said support member, whereby said first section rotatably supports said first swivel member from said support member and is locked in place by means of a threaded bolt extending into said threaded cylindrical opening in the first section;

(n) said second section of said first swivel member being a horizontally disposed solid cylinder whose diameter is greater than the diameter of the first section, the second section containing a rear face integral with the front face of said first section such that both sections share a common horizontal axis and wherein the circumference of the second section is parallel to the circumference of the arc portion of the support member;

(o) the rear face of said second section of said first swivel member containing a multiplicity of holes positioned at various degrees from the horizontal, and designed to be aligned with and accommodate a protruding forward end of said rod within said support member so that said first swivel member can quickly be set at a specific degree to the horizontal by insertion of said rod into one of the multiplicity of holes in the rear face of the second section of said first swivel member;

(p) the third section of said first swivel member being a solid cylinder whose axis is substantially perpendicular to the common axis of the first and second sections, and attached to the front face of the second section along a portion of its circumference by fastening means, such that the rear face of the third section is substantially parallel to one portion of the circumference of the second section;

(q) the fourth section of said first swivel member being a solid cylinder extending from the front face of the third section such that they share a common axis, with the front face of the fourth section containing a threaded cylindrical opening extending into the cylinder; 1

(r) said first swivel member being spaced a sufficient distance above said base member so that its second, third and fourth sections will not directly engage the base member when the first swivel member is rotated upon the first section;

(s) a second swivel member positioned beside said first swivel member and rotatably supported from the fourth section of said first swivel member;

(t) said second swivel member being of one piece construction and containing three distinct sections; a fifth section, a sixth section and a seventh section;

(u) said fifth section of said second swivel member being a torroidal cylinder whose outer diameter is substantially the same as the outer diameter of said third section and whose circumference contains a degree scale of 360 degrees adjacent its rear face;

(v) the interior of said fifth section containing a central opening which is designed to accommodate the cylindrical fourth section of said first swivel member;

(w) said fifth section being thereby movably attached to said fourth section by means of a threaded bolt which extends from a front face of said fifth section into the threaded opening in said fourth section, whereby the rear face of said fifth section is adjacent the front face of said third section;

(x) said sixth section being a mating section and rigidly attached to the circumference of said fifth section and adjacent its front face, to thereby provide a connection and separation between the fifth section and the seventh section;

(y) said seventh section being a cylinder whose axis is approximately perpendicular to the axes of the first and fourth sections, and joined to the sixth section at a portion of its lower face such that a portion of the circumference of the seventh section is substantially parallel to a front face of the fifth section.

(z) said seventh section containing a deep cylindrical recess which begins at its upper face and extends through most of the thickness of the seventh section;

(aa) a third swivel member rotatably supported by the seventh section of said second swivel member;

(bb) said third swivel member being a solid cylinder whose diameter is substantially the same as the diameter of said seventh section, and containing a stem extending from its lower surface which is accommodated within the cylindrical recess of said seventh section and tightened within it by means of a transverse screw within a wall of the seventh section;

(cc) the circumference of said third swivel member containing a 360 degree scale adjacent its lower surface;

(dd) the upper surface of said third swivel member containing means to rigidly retain a work piece holder; and (ee) the diameter of the cylinders about which the swivel members rotate, which are the first and fourth sections of the first swivel member and the stem of the third swivel member being thick as compared to their lengths;

(ff) whereby the work piece holding member and work piece contained therein may be selectively supported at any three-dimensional angular position relative to said base by means of rotation of said swivel members with respect to each other and to said support member along their respective cylinders and in accordance with the degree scale markings.

8. A tool which can be converted from a multiple angle work piece holder assembly into an indexing head, wherein the multiple angle work piece holder assembly contains the following elements: (a) a base member adapted to rest upon a flat supporting surface, (b) the base member containing a multiplicity of edges and an upper and lower surface, (c) a support member rigidly attached to the upper surface of said base member and adjacent its rear edges, and extending vertically upward therefrom, (d) the lower portion of the support member containing two substantially vertically disposed sides which extend into a curved upper area which terminates in a 180 degree arc, (e) the support member further comprising a substantially flat front face and a rear face which extends radially outward, (f) the support member further comprising a transverse cylindrical opening which extends through the entire thickness of the support member and having its axis disposed in a substantially horizontal direction, (g) the support member further comprising a horizontally disposed recess along one of its vertically disposed sides, and further comprising a horizontally disposed hole running parallel to the recess and spaced apart from it and extending through the entire thickness of the support member (h) a movable rod contained within the horizontally disposed hole and capable of being slidably moved within the hole by means of a transverse bolt which extends from the horizontally disposed recess through a transverse opening and to the surface of the movable rod, whereby the rod can be caused to protrude through the front face and the rear face of the support member, (i) a degree scale containing approximately 180 degrees place upon the curved upper portion of the support member and adjacent its front face, (j) a first swivel member positioned beside said support member, (k) the first swivel member being of one piece construction and containing four distinct sections, a first section, a second section, a third section and a fourth section, (l) the first section of the first swivel member being a horizontally disposed cylinder with a flat rear face, a flat front face, with the rear face containing a central threaded cylindrical opening which extends into the cylinder, (m) the diameter of the first section being accommodated within the transverse cylindrical opening in the support member, whereby the first section rotatably supports the first swivel member from the support member and is locked in place by means of a threaded bolt extending into the threaded cylindrical opening in the first section, (n) the second section of the first swivel member being a horizontally disposed solid cylinder whose diameter is greater than the diameter of the first section, the second section containing a rear face integral with the front face of the first section such that both sections share a common horizontal axis and wherein the circumference of the second section is parallel to the circumference of the arc portion of the support member, (o) the rear face of the second section of the first swivel member containing a multiplicity of holes positioned at various degrees from the horizontal, and designed to be aligned with and accomodate a protruding forward end of the rod within the support member so that the first swivel member can quickly be set at a specific degree to the horizontal by insertion of the rod into one of the multiplicity of holes in the rear face of the second section of the first swivel member, (p) the third section of the first swivel member being a solid cylinder whose axis is substantially perpendicular to the common axis of the first and second sections, and rigidly attached to the front face of the second section along a portion of its circumference, such that the rear face of the third section is substantially parallel to one portion of the circumference of the second section, (g) the fourth section of the first swivel member being a solid cylinder extending from the front face of the third section such that they share a common axis, with the front face of the fourth section containing a threaded cylindrical opening extending into the cylinder, (r) the first swivel member being spaced a sufficient distance above the base member so that its second, third and fourth sections will not directly engage the base member when the first swivel member is rotated upon the first section, (s) a second swivel member positioned beside said first swivel member and rotatably supported from the fourth section of the first swivel member, (t) the second swivel member being of one piece construction and containing three distinct sections, a fifth section, a sixth section and a seventh section, (u) the first section of the second swivel member being a torroidal cylinder whose outer diameter is substantially the same as the outer diaemter of the third section and whose circumference contains a degree scale of 360 degrees adjacent its rear face, (v) the interior of the first section containing a central opening which is designed to accommodate the cylindrical fourth section of the first swivel member, (w) the fifth section being thereby movably attached to the fourth section by means of a threaded bolt which extends from a front face of the fifth section into the threaded opening in the fourth section, whereby the rear face of the fifth section is adjacent the front face of the third section, (x) the sixth section being a mating section and adjacent its front face, to thereby provide a connection and separation between the fifth section and the seventh section, (y) the seventh section being a cylinder whose axis is approximately perpendicular to the axis of the first and fourth sections, and joined to the sixth section at a portion of its lower face such that a portion of the circumference of the seventh section is substantially parallel to a front face of the fifth section, (z) the seventh section containing a deep cylindrical recess which begins at its upper face and extends through most of the thickness of the seventh section, (aa) a third swivel member rotatably supported by the seventh section of the second swivel member, (bb) the third swivel member being a solid cylinder whose diameter is substantially the same as the diameter of the seventh section, and containing a stem extending from its lower surface which is accommodated with the cylindrical recess of the seventh section and tightened within it by means of a transverse screw within a wall of the seventh section, (cc) the circumference of the third swivel member containing a 360 degree scale adjacent its lower surface, (dd) the upper surface of the third swivel member containing means to rigidly retain a work piece holder, whereby the multiple angle work piece holder assembly can be converted into an indexing head by removing the movable rod from the support member and thereby removing the first, second and third swivel members from the tool, and substituting therefor the following elements to form an indexing head further comprising:

(a) a movable rod contained within the horizontally disposed hole and capable of being slidably moved within the hole by means of a transverse bolt which extends from the horizontally disposed recess through a transverse opening and to the surface of the movable rod, whereby the rod can be caused to protrude through the front face and the rear face of the support member;

(b) a hollow shaft placed through the transverse cylindrical opening in said support member, the front end of the shaft containing a collar which abuts the front face of said support member;

(c) the rear end of said hollow shaft containing a threaded circumference;

(d) an indexing wheel containing a multiplicity of holes throughout 360 degrees and further containing an internal threaded opening; and (e) said indexing wheel being threaded onto the rear end of said hollow shaft;

(f) whereby the indexing wheel abuts the rear face of said support member and can be rapidly set in place at any of its multiplicity of angles by insertion of the transverse rod within the support member into a corresponding one of the holes in the indexing wheel.

9. A tool which can be converted from a multiple angle work piece holder assembly into a collet holder, wherein the multiple angle work piece holder assembly contains the following elements: (a) a base member adapted to rest upon a flat supporting surface (b) the base member containing a multiplicity of edges and an upper and lower surface, (c) a support member rigidly attached to the upper surface of said base member and adjacent its rear edges, and extending vertically upward therefrom, (d) the lower portion of the support member containing two substantially vertically disposed sides which extend into a curved upper area which terminates in a 180 degree arc, (e) the support member further comprising a substantially flat front face and a rear face which extends radially outward, (f) the support member further comprising a transverse cylinderical opening which extends through the entire thickness of the support member and having its axis disposed in a substantially horizontal direction, (g) the support member further comprising a horizontally disposed recess along one of its vertically disposed sides, and further comprising a horizontally disposed hole running parallel to the recess and spaced apart from it and extending through the entire thickness of the support member, (h) a movable rod contained within the horizontally disposed hole and capable of being slidably moved within the hole by means of a transverse bolt which extends from the horizontally disposed recess through a transverse opening and to the surface of the movable rod, whereby the rod can be caused to protrude through the front face and the rear face of the support member, (i) a degree scale containing approximately 180 degrees place upon the curved upper portion of the support member and adjacent its front face, (j) a first swivel member positioned beside said support member, (k) the first swivel member being of one piece construction and containing four distinct sections, a first section, a second section, a third section and a fourth section, (l) the first section of the first swivel member being a horizontally disposed cylinder with a flat rear face, a flat front face, with the rear face containing a central threaded cylindrical opening which extends into the cylinder, (m) the diameter of the first section being accommodated within the transverse cylindrical opening in the support member, whereby the first section rotatably supports the first swivel member from the support member and is locked in place by means of a threaded bolt extending into the threaded cylindrical opening in the first section, (n) the second section of the first swivel member being a horizontally disposed solid cylinder whose diameter is greater than the diameter of the first section, the second section containing a rear face integral with the front face of the first section such that both sections share a common horizontal axis and wherein the circumference of the second section is parallel to the circumference of the arc portion of the support member, (o) the rear face of the second section of the first swivel member containing a multiplicty of holes positioned at various degrees from the horizontal, and designed to be aligned with and accommodate a protruding forward end of the rod within the support member so that the first swivel member can quickly be set at a specific degree to the horizontal by insertion of the rod into one of the multiplicity of holes in the rear face of the second section of the first swivel member, (p) the third section of the first swivel member being a solid cylinder whose axis is substantially perpendicular to the common axis of the first and second sections, and rigidly attached to the front face of the second section along a portion of its circumference, such that the rear face of the third section is substantially parallel to one portion of the circumference of the second section, (q) the fourth section of the first swivel member being a solid cylinder extending from the front face of the third section such that they share a common axis, with the front face of the fourth section containing a threaded cylindrical opening extending into the cylinder, (r) the first swivel member being spaced a sufficient distance above the base member so that its second, third and fourth sections will not directly engage the base member when the first swivel member is rotated upon the first section, (s) a second swivel member positioned beside said first swivel member and rotatably supported from the fourth section of the first swivel member, (t) the second swivel member being of one piece construction and containing three distinct sections, a fifth section, a sixth section and a seventh section, (u) the first section of the second swivel member being a torroidal cylinder whose outer diameter is substantially the same as the outer diameter of the third section and whose circumference contains a degree scale of 360 degrees adjacent its rear face, (v) the interior of the first section containing a central opening which is designed to accommodate the cylindrical fourth section of the first swivel member, (w) the fifth section being thereby movably attached to the fourth section by means of a threaded bolt which extends from a front face of the fifth section into the threaded opening in the fourth section, whereby the rear face of the fifth section is adjacent the front face of the third section, (x) the sixth section being a mating section and adjacent its front face, to thereby provide a connection and separation between the fifth section and the seventh section, (y) the seventh section being a cylinder whose axis is approximately perpendicular to the axis of the first and fourth sections, and joined to the sixth section at a portion of its lower face such that a portion of the circumference of the seventh section is substantially parallel to a front face of the fifth section, (z) the seventh section containing a deep cylindrical recess which begins at its upper face and extends through most of the thickness of the seventh section, (aa) a third swivel member rotatably supported by the seventh section of the second swivel member, (bb) the third swivel member being a solid cylinder whose diameter is substantially the same as the diameter of the seventh section, and containing a stem extending from its lower surface which is accommodated with the cylindrical recess of the seventh section and tightened within it by means of a transverse screw within a wall of the seventh section, (cc) the circumference of the third swivel member containing a 360 degree scale adjacent its lower surface, (dd) the upper surface of the third swivel member containing means to rigidly retain a work piece holder, whereby the multiple angle work piece holder assembly can be converted into a collet holder by removing the movable rod from the support member and thereby removing the first, second and third swivel members from the tool, and substituting therefor the following elements to form a collet holder further comprising:

(a) a hollow shaft placed through the transverse cylindrical opening in said support member, the front of the shaft containing a collar which abuts the front face of said support member;

(b) a collet inserted into said hollow shaft such that its front chuck end protrudes through the collar and its rear end protrudes through the rear face of said support member;

(c) the circumference of the rear end of said collet being threaded; and (d) a rear face plate screwed onto the threaded end of the collet.

10. A tool which can be converted from a multiple angle work piece holder assembly into a dresser, wherein the multiple angle work piece holder assembly contains the following elements: (a) a base member adapted to rest upon a flat supporting surface, (b) the base member containing a multiplicity of edges and an upper and lower surface, (c) a support member rigidly attached to the upper surface of said base member and adjacent its rear edges, and extending vertically upward therefrom, (d) the lower portion of the support member containing two substantially vertically disposed sides which extend into a curved upper area which terminates in a 180 degree arc, (e) the support member further comprising a substantially flat front face and a rear face which extends radially outward, (f) the support member further comprising a transverse cylindrical opening which extends through the entire thickness of the support member and having its axis disposed in a substantially horizontal direction, (g) the support member further comprising a horizontally disposed recess along one of its vertically disposed sides, and further comprising a horizontally disposed hole running parallel to the recess and spaced apart from it and, (h) a movable rod contained within the horizontally disposed hole and capable of being slidably moved within the hole by means of a transvere bolt which extends from the horizontally disposed recess through a transverse opening and to the surface of the movable rod, whereby the rod can be caused to protrude through the front face and the rear face of the support member, (i) a degree scale containing approximately 180 degrees place upon the curved upper portion of the support member and adjacent its front face, (j) a first swivel member positioned beside said support member, (k) the first swivel member being of one piece construction and containing four distinct sections, a first section, a second section, a third section and a fourth section, (l) the first section of the first swivel member being a horizontally disposed cylinder with a flat rear face, a flat front face, with the rear face containing a central threaded cylindrical opening which extends into the cylinder, (m) the diameter of the first section being accommodated within the transverse cylindrical opening in the support member, whereby the first section rotatably supports the first swivel member from the support member and is locked in place by means of a threaded bolt extending into the threaded cylindrical opening in the first section, (n) the second section of the first swivel member being a horizontally disposed solid cylinder whose diameter is greater than the diameter of the first section, the second section containing a rear face integral with the front face of the first section such that both sections share a common horizontal axis and wherein the circumference of the second section is parallel to the circumference of the arc portion of the support member, (o) the rear face of the second section of the first swivel member containing a multiplicity of holes positioned at various degrees from the horizontal, and designed to be aligned with and accomodate a protruding forward end of the rod within the support member so that the first swivel member can quickly be set at a specific degree to the horizontal by insertion of the rod into one of the multiplicity of holes in the rear face of the second section of the first swivel member, (p) third section of the first swivel member being a solid cylinder whose axis is substantially perpendicular to the common axis of the first and second sections, and rigidly attached to the front face of the second section along a portion of its circumference, such that the rear face of the third section is substantially parallel to one portion of the circumference of the second section, (q) the fourth section of the first swivel member being a solid cylinder extending from the front face of the third section such that they share a common axis, with the front face of the fourth section containing a threaded cylindrical opening extending into the cylinder, (r) the first swivel member being spaced a sufficient distance above the base member so that its second, third and fourth sections will not directly engage the base member when the first swivel member is rotated upon the first section (s) a second swivel member positioned beside said first swivel member and rotatably supported from the fourth section of the first swivel member, (t) the second swivel member being of one piece construction and containing three distinct sections, a fifth section, a sixth section and a seventh section, (u) the first section of the second swivel member being a torroidal cylinder whose outer diameter is substantially the same as the outer diameter of the third section and whose circumference contains a degree scale of 360 degrees adjacent its rear face, (v) the interior of the first section containing a central opening which is designed to accommodate the cylindrical fourth section of the first swivel member, (w) the fifth section being thereby movably attached to the fourth section by means of a threaded bolt which extends from a front face of the fifth section into the threaded opening in the fourth section, whereby the rear face of the fifth section is adjacent the front face of the third section, (x) the sixth section being a mating section and adjacent its front face, to thereby provide a connection and separation between the fifth section and the seventh section, (y) the seventh section being a cylinder whose axis is approximately perpendicular to the axis of the first and fourth sections, and joined to the sixth section at a portion of its lower face such that a portion of the circumference of the seventh section is substantially parallel to a front face of the fifth section, (z) the seventh section containing a deep cylindrical recess which begins at its upper face and extends through most of the thickness of the seventh section, (aa) a third swivel member rotatably supported by the seventh section of the second swivel member, (bb) the third swivel member being a solid cylinder whose diameter is substantially the same as the diameter of the seventh section, and containing a stem extending from its lower surface which is accommodated with the cylindrical recess of the seventh section and tightened within it by means of a transverse screw within a wall of the seventh section, (cc) the circumference of the third swivel member containing a 360 degree scale adjacent its lower surface, (dd) the upper surface of the third swivel member containing means to rigidly retain a work piece holder, whereby the multiple angle work piece holder assembly can be converted into a dresser by remvoing the movable rod from the support member and thereby removing the first, second and third swivel members from the tool, and substituting therefor the following elements to form a dresser further comprising:

(a) a hollow shaft placed through the transverse cylindrical opening in said support member, the front of the shaft containing a collar which abuts the front face of said support member;
(b) a chuck inserted into said hollow shaft such that its receiving end protrudes through the collar and its rear end protrudes through the rear face of said support member;
(c) means to firmly secure the chuck within said hollow shaft and within said support member;
(d) a dresser containing a shaft which is inserted into said chuck such that the front portion of the dresser protrudes through the collar and extends from the chuck and from the front face of said support member; and
(e) a cutter held adjacent the remote portion of the protruding end of the shaft.

* * * * *